United States Patent
Slaats et al.

(10) Patent No.: US 8,235,418 B2
(45) Date of Patent: Aug. 7, 2012

(54) AIRBAG

(75) Inventors: Paul Maria Antonius Slaats, Berkley, MI (US); Jim Karlow, Commerce Township, MI (US); Pongdet Paul Wipasuramonton, Rochester, MI (US); Moe Boumarafi, Oakland Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 71 days.

(21) Appl. No.: 12/379,061

(22) Filed: Feb. 11, 2009

(65) Prior Publication Data

US 2009/0212537 A1 Aug. 27, 2009

Related U.S. Application Data

(60) Provisional application No. 61/064,040, filed on Feb. 12, 2008.

(51) Int. Cl.
*B60R 21/213* (2011.01)
*B60R 21/216* (2011.01)

(52) U.S. Cl. .................. 280/743.2; 280/730.2

(58) Field of Classification Search .............. 280/728.2, 280/730.1, 729, 743.2, 730.2, 743.1, 728.1
See application file for complete search history.

(56) References Cited

U.S. PATENT DOCUMENTS

| | | | | |
|---|---|---|---|---|
| 6,113,132 | A * | 9/2000 | Saslecov | 280/730.1 |
| 6,237,943 | B1 * | 5/2001 | Brown et al. | 280/730.2 |
| 6,688,641 | B2 * | 2/2004 | Dominissini | 280/730.2 |
| 7,114,744 | B2 | 10/2006 | Sunabashiri | |
| 7,648,160 | B2 * | 1/2010 | Mori et al. | 280/730.1 |
| 7,762,579 | B2 * | 7/2010 | Garner | 280/730.2 |
| 7,806,432 | B2 * | 10/2010 | Nelson et al. | 280/730.2 |
| 7,878,530 | B2 * | 2/2011 | Mizuno et al. | 280/730.1 |
| 2004/0066022 | A1 * | 4/2004 | Mori et al. | 280/730.1 |
| 2004/0195809 | A1 * | 10/2004 | Tanase et al. | 280/730.2 |
| 2004/0232665 | A1 * | 11/2004 | Bendig et al. | 280/730.2 |
| 2004/0239084 | A1 * | 12/2004 | Mori et al. | 280/730.1 |
| 2006/0055153 | A1 * | 3/2006 | Hirata | 280/728.1 |
| 2006/0097491 | A1 * | 5/2006 | Saberan et al. | 280/730.1 |
| 2006/0138754 | A1 * | 6/2006 | Hirata et al. | 280/730.1 |
| 2006/0214401 | A1 * | 9/2006 | Hirata | 280/730.1 |
| 2006/0290122 | A1 * | 12/2006 | Woydick | 280/743.2 |

(Continued)

FOREIGN PATENT DOCUMENTS

JP 2005-161976 A 6/2005

(Continued)

OTHER PUBLICATIONS

Jörg Hoffmann, et al., Application of Rear Head Airbag to Mitigate Rear Impact Injuries, Paper No. 07-0315, 5 pgs.

(Continued)

*Primary Examiner* — Paul N Dickson
*Assistant Examiner* — Karen A Beck
(74) *Attorney, Agent, or Firm* — Foley & Lardner LLP

(57) ABSTRACT

An airbag system for a vehicle includes an inflatable rear curtain airbag configured to deploy adjacent a rear window positioned between rear pillars in the vehicle, a housing for the rear curtain airbag, and an inflator to inflate the rear curtain airbag. The housing, rear curtain airbag, and inflator are mounted to a roof of the vehicle. The rear curtain airbag is configured to deploy to prevent ejection of an occupant out of the rear window and to prevent objects intruding through the rear window from contacting an occupant.

13 Claims, 4 Drawing Sheets

U.S. PATENT DOCUMENTS

2007/0241544 A1* 10/2007 Ohrvall et al. ............. 280/730.2
2008/0030011 A1*  2/2008 Ishikawa et al. ........... 280/730.2
2008/0238045 A1* 10/2008 Garner ....................... 280/728.2
2009/0212537 A1*  8/2009 Slaats et al. ................ 280/728.2

FOREIGN PATENT DOCUMENTS

| | | |
|---|---|---|
| JP | 2007-022152 A | 2/2007 |
| KR | 2004-0031250 A | 4/2004 |
| KR | 10-0599571 B1 | 7/2006 |

OTHER PUBLICATIONS

International Search Report dated May 28, 2009 for International Application No. PCT/US2009/033797.

* cited by examiner

AIRBAG

CROSS-REFERENCE TO RELATED PATENT APPLICATIONS

This application claims priority to U.S. Provisional Patent Application No. 61/064,040, filed Feb. 12, 2008, which is incorporated herein by reference in its entirety.

BACKGROUND

The present disclosure relates generally to the field of vehicle airbags. More specifically, the present disclosure relates to a vehicle rear window curtain airbag.

Vehicle airbags are used to help protect vehicle occupants from injury in the event of a vehicle crash. Head Side Airbags (HSABs) or Side Curtain Airbags (SCABs) are provided in vehicles for protection of occupants during side impact collisions and are generally mounted in a vehicle through attachments to sheet metal at a roof rail location at either side of the vehicle, i.e., driver side and/or passenger side.

Many vehicles (i.e., minivans, sport utility vehicles, crossover vehicles, city cars, hatchbacks, pick-up trucks, etc) have substantially flat rear ends and include seating that is provided in close proximity to a rear window. In a rear collision, a vehicle or other object may intrude into the passenger compartment of the vehicle being struck. In such a collision, occupants of the rear-ended vehicle risk being struck with debris or objects entering the vehicle interior through the rear window, being struck by glass from a broken rear window, or may collide with the rear window, causing injuries to the head or upper extremities. Further, in collisions or rollover events, occupants may be ejected out of the vehicle through the rear window.

It would be advantageous to provide a curtain airbag proximate to the rear window of a vehicle to reduce the likelihood of injury to the occupant and reduce the likelihood the occupant will be ejected through the rear window.

SUMMARY

One embodiment of the disclosure relates to an airbag system for a vehicle. The airbag system comprises an inflatable rear curtain airbag configured to deploy adjacent a rear window positioned between rear pillars in the vehicle. The rear curtain airbag includes a plurality of vertical inflatable chambers. The airbag system further includes a housing for the rear curtain airbag and an inflator configured to provide inflation gas for inflating the rear curtain airbag. The rear curtain airbag is configured to extend between the rear pillars and cover the rear pillars and at least a majority of the rear window when fully deployed.

Another embodiment of the disclosure relates to an airbag system for a vehicle. The airbag system comprises an inflatable rear curtain airbag configured to deploy adjacent a rear window positioned between rear pillars in the vehicle. The rear curtain airbag includes a plurality of vertical inflatable chambers. The airbag system further includes a housing for the rear curtain airbag and an inflator configured to provide inflation gas for inflating the rear curtain airbag.

Another embodiment of the disclosure relates to an airbag system for a vehicle. The airbag system comprises an inflatable rear curtain airbag configured to deploy adjacent a rear window positioned between rear pillars in the vehicle. The rear curtain airbag includes an inflatable central region positioned between the rear pillars and first and second inflatable pillar lobes. Each of the first and second pillar lobes are positioned adjacent one of the rear pillars. The airbag system further includes a housing for the rear curtain airbag and an inflator configured to provide inflation gas for inflating the rear curtain airbag. The housing, rear curtain airbag, and inflator are mounted to a roof of the vehicle. The rear curtain airbag is configured to bend along a substantially vertically extending first bend line dividing the central region from the first pillar lobe. The rear curtain airbag is configured to bend along a substantially vertically extending second bend line dividing the central region from the second pillar lobe.

Yet another embodiment of the disclosure relates to an airbag system for a vehicle. The airbag system comprises an inflatable rear curtain airbag configured to deploy adjacent a rear window positioned between rear pillars in the vehicle, a housing for the rear curtain airbag, an inflator configured to provide inflation gas for inflating the rear curtain airbag, and an external deployment strap connected at one end to the rear curtain airbag. The deployment strap is configured to control a position of the rear curtain airbag when deployed. The airbag system further comprises a rear tether rod fixed to one of the rear pillars in the vehicle. A second end of the external deployment strap is connected to the rear tether rod and configured to slide along the rear tether rod during deployment of the rear curtain airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
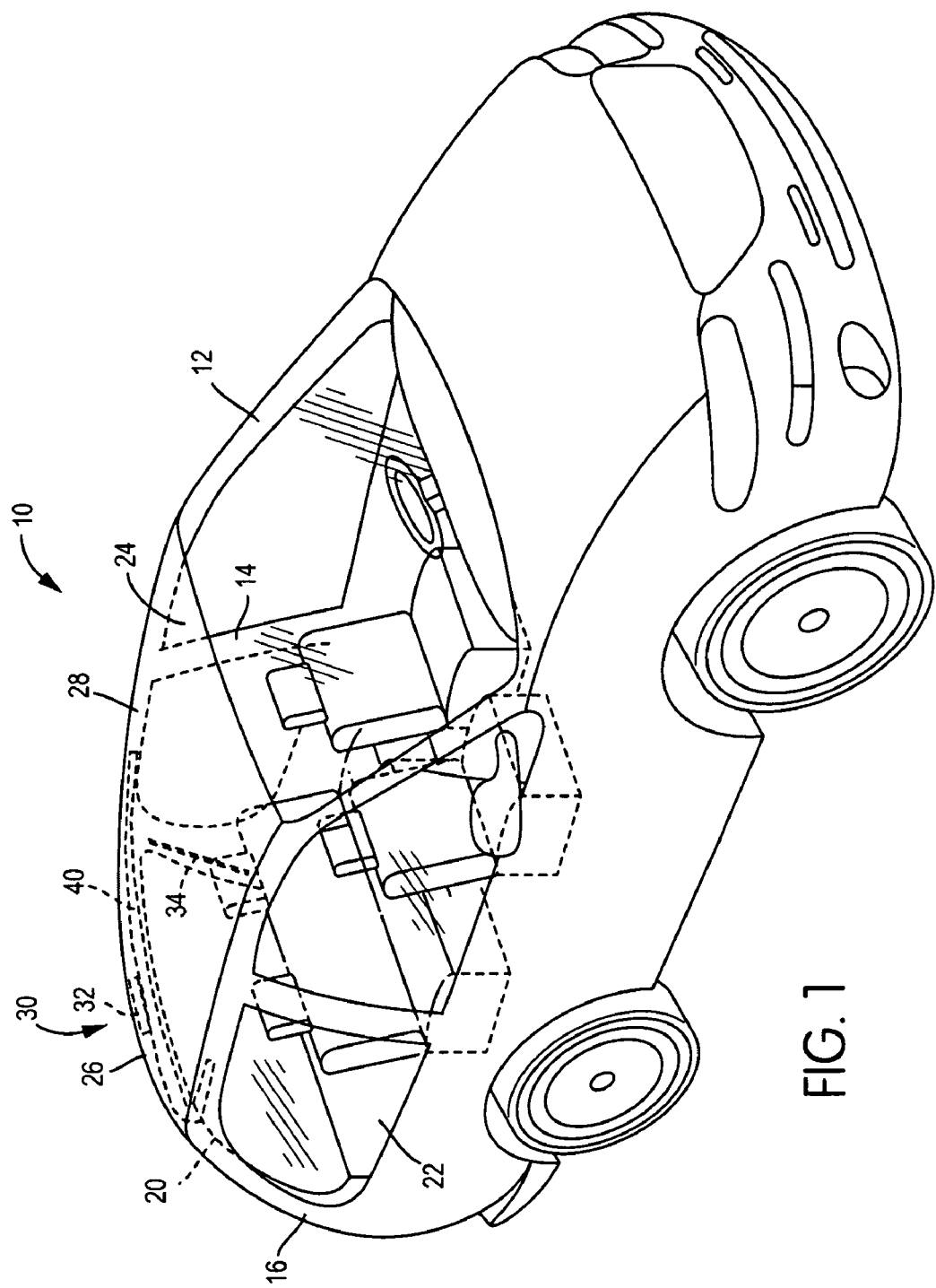
FIG. 1 is a perspective view of a vehicle illustrating support pillars for a frame of the vehicle, windows, and a storage location for a rear window curtain airbag according to an exemplary embodiment.

Referring in general to FIGS. 1-4, a vehicle 10 is shown including a rear curtain airbag module 30 according to an exemplary embodiment. The rear curtain airbag module 30 is provided to help protect the occupants of the vehicle 10 in a collision or rollover event. Referring to FIG. 1, the vehicle 10 includes a plurality of vertical frame members located on both sides of the vehicle 10 that provide structural support for the windshields and windows. A first member (e.g., pillar, column, etc.), shown as A-pillar 12, supports the front vehicle window; a second member, shown as B-pillar 14, supports the side windows 22; and a third member, shown as C-pillar 16, supports the rear window 20 of the vehicle.

The following disclosure uses "C-pillar" for convenience as a general term to refer to the rear-most vertical support pillar of the vehicle 10. Some exemplary vehicles may have fewer than three support pillars on either side (i.e., a microcar) in which the B-pillar is the rear-most pillar. Some other exemplary vehicles may have more than three support pillars on either side (i.e., minivans, sport utility vehicles, etc.) in which the D-pillar or another additional pillar is the rear-most vertical support pillar. It should be understood by one skilled in the art that the rear curtain airbag module 30 described in the following disclosure may be used to provide protection for the rear-most support vertical support pillar in a wide variety of vehicles.

The airbag module 30 includes an inflator 32 and an inflatable curtain airbag or cushion 40. The curtain airbag 40 is preferably stored along the roof 24 of the associated vehicle 10, for example, along the vehicle roof rail 26 above the rear window 20 opening, in a conventional manner. According to an exemplary embodiment, the curtain airbag 40 includes a plurality of fabric tabs 42 (FIG. 2) with which it is coupled to the rear roof rail 26. The curtain airbag 40 is preferably secured in a folded state beneath a trim panel such as a headliner panel 18. A weather strip trim piece may be provided to cover a gap between the headliner panel 18 and the rear roof rail 26. According to another exemplary embodiment, the inflator 32 of the airbag module 30 is configured to be integrally mounted onto an interior vehicle part such as the automobile headliner panel 18.

The inflator 32, such as a conventional gas-filled inflator, supplies gas for inflation/deployment of the restraint curtain airbag 40. An impact sensor (not shown in the FIGURES) located within the vehicle's control system is used to sense impact collisions. During a vehicle collision or rollover event, the inflator 32 is activated to supply pressurized gas to inflate the curtain airbag 40. The inflation gas enters the curtain airbag 40 via the inflator's 32 outflow opening 33, causing the curtain airbag 40 to emerge from underneath the headliner panel and be driven away from a storage position and downward into a deployed position. The outflow opening 33 and/or the inflator 32 is positioned approximately midway between the rear pillars of the vehicle proximate a lateral center of the rear curtain airbag 40.

Figure 2:
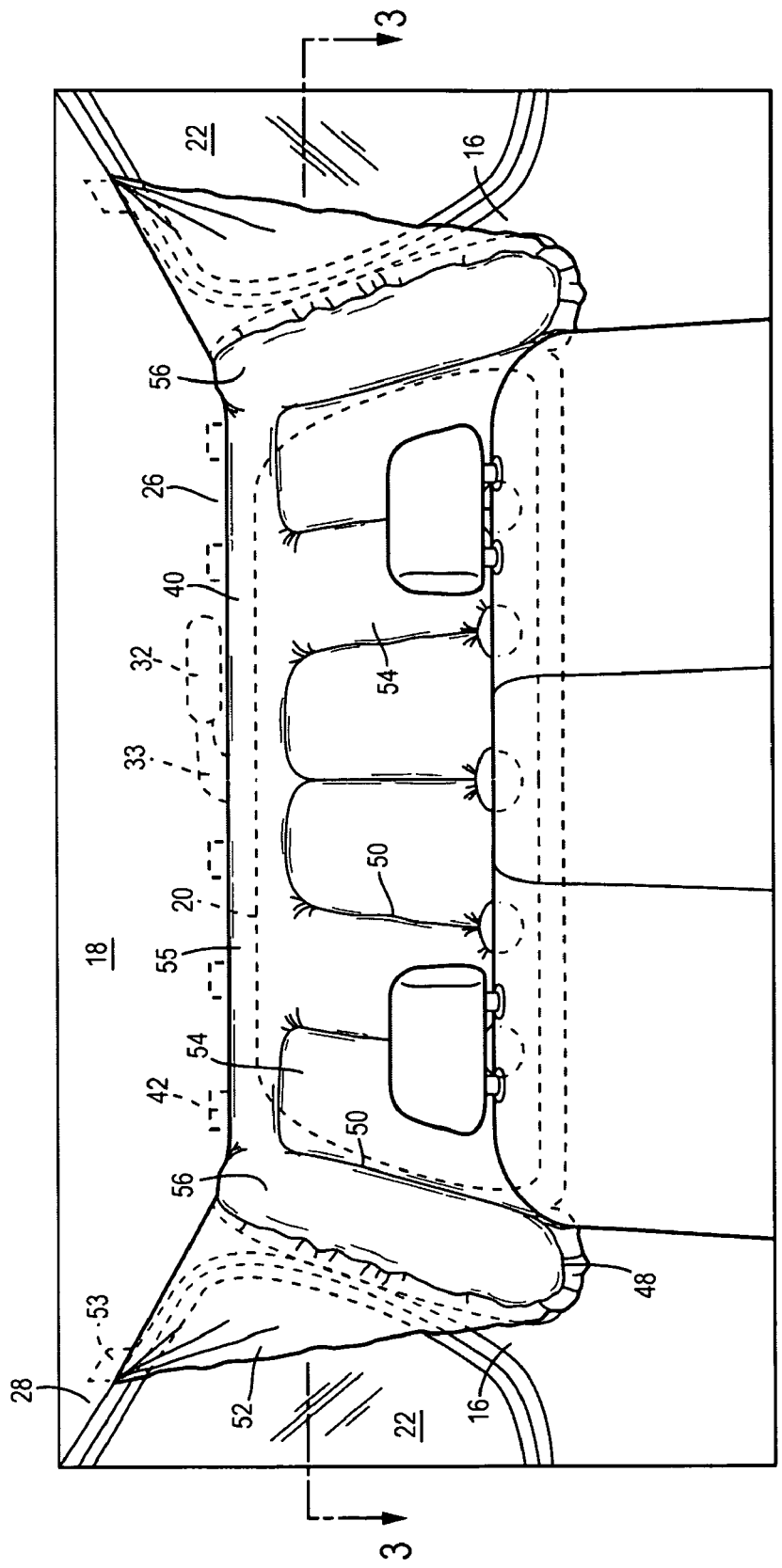
FIG. 2 is a front perspective view of a vehicle interior illustrating a rear window curtain airbag following deployment, according to an exemplary embodiment.

As shown best in FIG. 2, in the deployed position, the curtain airbag 40 is disposed between the occupant and the rear of the vehicle 10 and generally covers at least a portion of the opening for the rear window 20. The curtain airbag 40 preferably covers the entire rear window 20.

Figure 3:
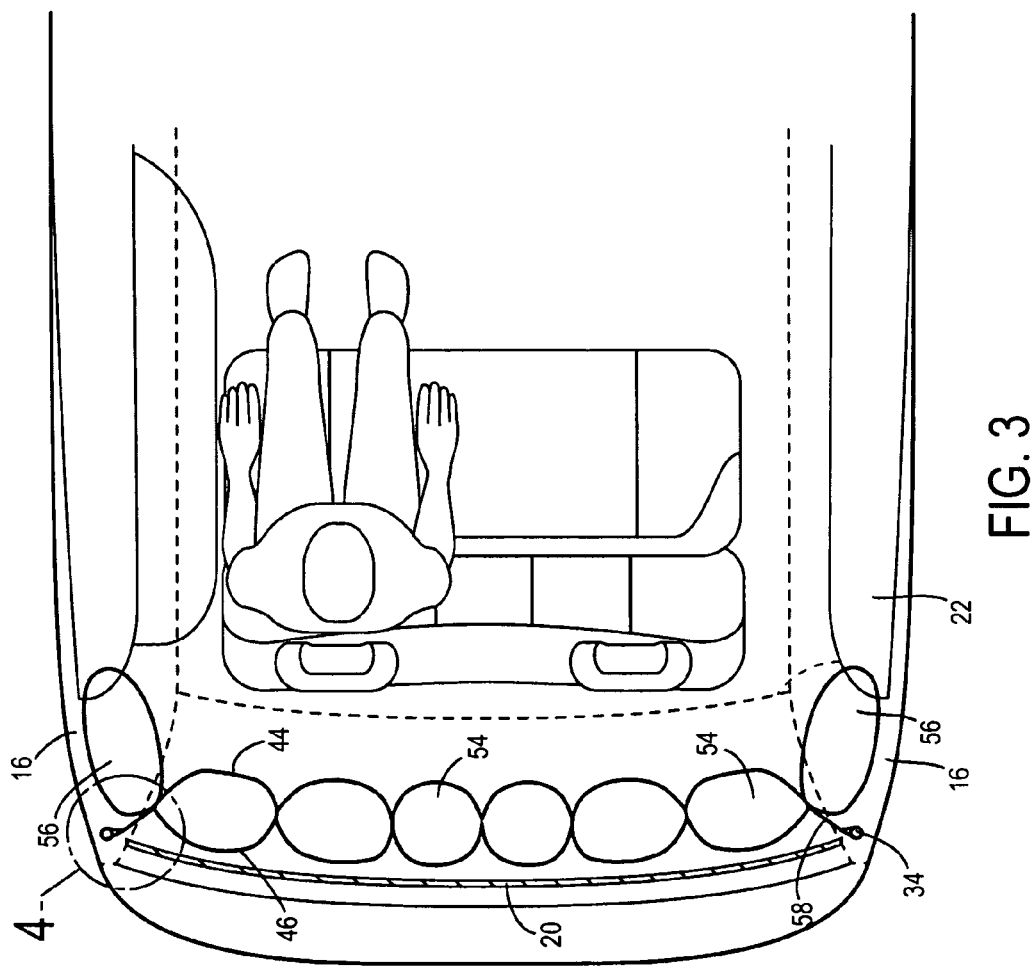
FIG. 3 is a top partial cross-section of the vehicle of FIG. 2 taken along line 3-3 showing the rear window curtain airbag following deployment.

The curtain airbag 40 is generally formed from a first panel 44 (e.g., inboard panel, inner panel, front panel, etc.) and a second panel 46 (e.g., outboard panel, outer panel, rear panel, etc.) that are coupled together by a plurality of seams 48 and 50. According to an exemplary embodiment, the first panel 44 and the second panel 46 are a nylon fabric or any other suitable material. The seams 48 and 50 may be formed as a sewn connection (e.g., with a thread), a woven connection, an adhesive connection, or any other suitable connection known in the art for coupling together two fabric panels. The curtain airbag 40 may be divided into two or more vertical compartments or chambers. Passages or ports are generally provided between individual chambers such that the chambers are in fluid communication with each other. Referring especially to FIGS. 2-3, the curtain airbag 40 comprises a first group of central (vertical) lobes or chambers 54 that are configured to cover the rear window 20 of the vehicle 10, and at least two (vertical) side lobes or chambers 56 that are disposed to the side of the vehicle 10, generally along the vehicle C-pillars 16. The central vertical chambers 54 are arranged approximately symmetrical along the rear curtain airbag 40. The seams 50 separating each side lobe 56 from the adjacent central chamber 54 are sometimes referred to as "zero depth tethers."

The curtain airbag 40 also includes an inflation flow path (e.g. 55) at a top of the curtain airbag 40. The inflation flow path 55 is a path for inflation gases to flow to inflate (fill) the vertical chambers 54 and side pillar lobes 56.

The curtain airbag 40 may also have a multitude of un-inflated portions such as un-inflated portions that generally separate the chambers. One such un-inflated portion may comprise a panel 52 (e.g., sail panel) proximate to the side of the vehicle 10 (e.g., proximate to the C-pillar 16). The sail panel 52 is coupled, on one end, to the side roof rail 28 above the side window 22 and, on the opposite end, to the main body of the curtain airbag 40. The sail panel 52 may be a separate fabric panel or may be integrally formed with one or both of the first panel 44 or second panel 46.

Sail panels 52 help to stabilize the side chambers 56. According to an exemplary embodiment, the sail panel 52 is coupled to the vehicle side roof rail 28 at one or more attachment points 53 (e.g., with fabric tabs). The sail panels 52 may be separate panels coupled to the side chambers 56 or may be formed integrally with the first panel 44 and/or the second panel 46 comprising the curtain airbag cushion 40. In an alternative embodiment, the sail panels 52 can include inflatable chambers.

According to other exemplary embodiments, the side chambers 56 may be extended such that the side chambers 56 are disposed between the occupant and the side window 22. The side chambers 56 then provide side impact and rollover protection for occupants seated in the rear row by being disposed both between the occupant and the C-pillar 16 and between the occupant and the side window 22. Extending the side chambers 56 to provide coverage over the side windows 22 proximate to the rear row seating eliminates the need for a separate side curtain airbag to be extended to provide protection for occupants in the rear row. Extending the side chambers 56 may be desirable in vehicles with a longer wheelbase such as vans and sport utility vehicles.

In the event the impact sensor(s) detects a collision such as a rear impact or a rollover, the curtain airbag 40 deploys from behind the rear of the headliner 18 downward and across the rear window 20. Additionally, the side lobes 56 extend to cover the C-pillars 16 of the vehicle 10 to provide additional protection for the vehicle occupants. The central chambers 54 and the side chambers 56 are arranged vertically. The central chambers 54 extend downward past the lower edge of the rear window 20.

To follow the contour of the rear window 20 and the C pillars 16 of the vehicle 10, the curtain airbag 40 is formed to be generally U-shaped when inflated, such that the side chambers 56 are arranged at an angle relative to the central chambers 54 (e.g., bent, folded, etc.).

Several mechanisms may be used to arrange the side chambers 56 at an angle relative to the central chambers 54 and bend along the C-pillars 16. For example, the seams 50 separating the chambers 54 and 56 from each other may be located such that they are generally aligned with the C-pillars 16. Therefore, when the airbag cushion 40 is inflated, the seam 50 provides a natural bend line for the side chambers 56 to bend relative to the central chambers 54. Further, external deployment straps or tethers 58 may be located proximate to the edge of the transition between the rear window 20 and the C-pillars 16 to create bend lines between the side chambers 56 and the central chambers 54.

Figure 4:
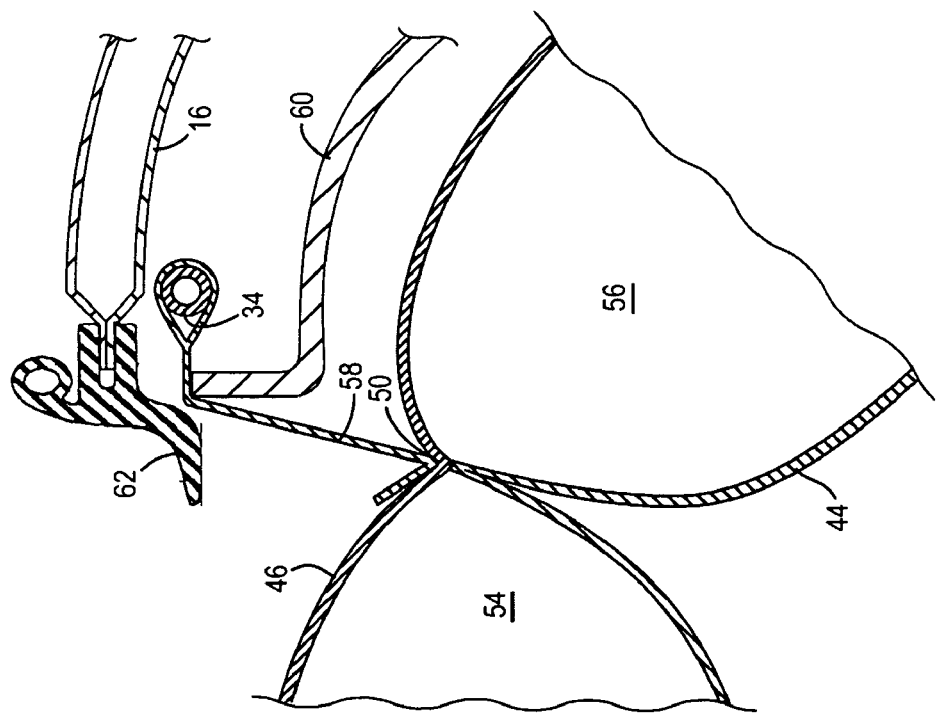
FIG. 4 is a detail cross-section of a left rear C-pillar for a vehicle showing a tether rod provided to control the deployment of a rear curtain airbag according to an exemplary embodiment.
Figure 5:
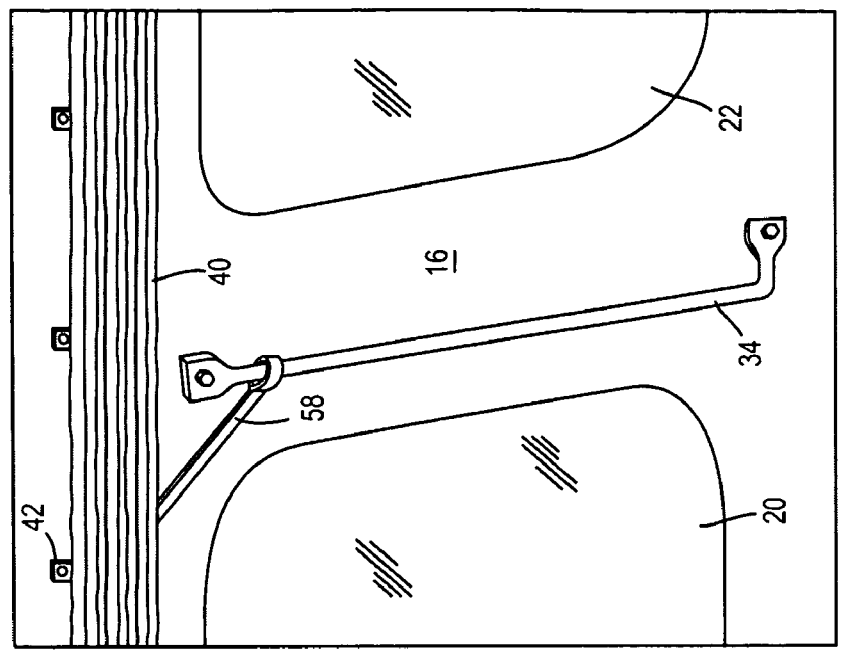
FIG. 5 is an elevation view of a C-pillar for a vehicle according to an exemplary embodiment showing an external deployment strap and a tether rod.

As shown best in FIGS. 4 and 5, tethers 58 may be provided to apply lateral tension to the curtain airbag 40 and to direct the unfolding and deployment of the curtain airbag 40. The tethers 58 are coupled to the second (outboard) panel 46 of the curtain airbag 40 and are configured to slide along elongated members or tether rods 34. The tethers 58 comprise closed loops of preferably substantially flat, flexible material. The tethers 58 may be formed from a conventional textile material, or formed from some other suitable material such as nylon webbing, etc. In a preferred embodiment, the tethers 58 are affixed to the curtain airbag proximate to a lower edge along the seam lines 50 separating the side chambers 56 from the central chambers 54. According to other exemplary embodiments, the tethers 58 may be alternatively positioned for other applications, for instance along the side or near the bottom corner of the cushion 40.

The elongated members 34 (cords, rods, etc.) are coupled to the frame of the vehicle 10, such as along C-pillars 16. The elongated member 34 is preferably a rigid member that is affixed to the C-pillar 16 with brackets at either end. The tether 58 slidably engages the elongated member 34 during deployment. As the cushion 40 moves outward, preferably downward from the roof rails 26 and 28, the expanding cushion 40 is guided by the tether 58, as it slides along the elongated member 34. The engagement of the tethers 58 and the elongated members 34 resists the tendency of the inflated curtain airbag 40 to pull away from the elongated members 34 and, thus, remain in close proximity to the rear window 20. Thus, cooperation between the tether 58 and elongated member 34 during deployment assists in both positioning and tensioning the curtain airbag 40, and provides lateral support thereto. As shown in FIG. 4, the elongate member 34 and tether 58 can extend from (attached to) the C-pillar 16 such that a portion of the elongate member 34 and tether 58 are positioned behind a trim panel 60 and/or additional trim piece 62 covering the C-pillar 16.

By orienting the chambers 54 and 56 vertically, the curtain airbag 40 is better able to retain occupants in the vehicle 10. The curtain airbag 40 is coupled to the elongated members 34 (e.g., with tethers 58) in an uninflated state. As the chambers 54 and 56 inflate, they shrink horizontally relative to the uninflated state and therefore cause the elongated members 34 and tethers 58 to apply a horizontal tension on the curtain airbag 40. Horizontally arranged chambers, on the other hand, do not shrink as much horizontally upon inflation.

In an exemplary embodiment, the deployment of the rear window airbag module 20 can help trap airborne debris occurring from the collision. Additionally, in the event of a rollover, the airbag module 20 can function to limit the ejection of the upper extremity, body parts, or the entire body of an occupant from the rear of the vehicle 10.

It is important to note that the construction and arrangement of the rear window curtain airbag as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature of number of discrete elements or positions may be altered or varied. Other substitutions, modifications, changes and omissions may be made in the design, operating conditions and arrangement of the exemplary embodiments.

What is claimed is:

1. An airbag system for a vehicle, comprising:
   an inflatable rear curtain airbag configured to deploy adjacent a rear window positioned between rear pillars in the vehicle, wherein the rear curtain airbag includes an inflatable central region positioned between the rear pillars and first and second inflatable pillar lobes, wherein each of the first and second pillar lobes are positioned adjacent one of the rear pillars;
   an uninflatable sail panel attached to the rear curtain airbag, the sail panel being coupled at one end to a side roof rail above a side window and at an opposite end to one of the first and second pillar lobes, wherein the uninflatable sail panel covers at least a portion of the side window;
   a housing for the rear curtain airbag; and
   an inflator configured to provide inflation gas for inflating the rear curtain airbag,
   wherein the housing, rear curtain airbag, and inflator are mounted to a roof of the vehicle,
   wherein the rear curtain airbag is configured to bend along a substantially vertically extending first bend line dividing the central region from the first pillar lobe, and
   wherein the rear curtain airbag is configured to bend along a substantially vertically extending second bend line dividing the central region from the second pillar lobe, and
   wherein the first and second bend lines each include a zero depth tether.

2. The airbag system of claim 1, wherein the rear curtain airbag is configured to deploy to a position in order to prevent ejection of an occupant out of the rear window and to prevent objects that intrude through the rear window from contacting an occupant.

3. The airbag system of claim 1, wherein the housing, the rear curtain airbag, and the inflator are mounted to the roof of the vehicle on a rear roof rail that extends between the rear pillars.

4. The airbag system of claim 1, wherein the inflator includes an outflow opening, wherein inflation gas exits the inflator and enters the rear curtain airbag, wherein the outflow opening is positioned approximately midway between the rear pillars of the vehicle proximate a lateral center of the rear curtain airbag.

5. The airbag system of claim 1, wherein the rear curtain airbag includes at least one mounting tab for attaching the rear curtain airbag to the roof of the vehicle.

6. The airbag system of claim 1, wherein the airbag housing is mounted to a rear roof rail behind a roof headliner.

7. The airbag system of claim 1, wherein the inflatable central region comprises a plurality of vertical inflatable chambers, and wherein the first and second pillar lobes comprise vertically extending inflatable chambers.

8. The airbag system of claim 7 wherein the first and second pillar lobes are fluidly connected to the plurality of vertical chambers via an inflation path located at a top of the rear curtain airbag.

9. The airbag system of claim 7, wherein the plurality of vertical inflatable chambers are separated by internal seams that connect opposing surfaces of material forming the rear curtain airbag.

10. The airbag system of claim 7, wherein the vertical inflatable chambers are arranged approximately symmetrical along the rear curtain airbag.

11. The airbag system of claim 1, wherein the tether comprises a seam connecting opposing surfaces of the rear curtain airbag.

12. The airbag system of claim 1, wherein the first and second pillar lobes are configured so that when the pillar lobes are inflated, each of the pillar lobes curves around the adjacent rear pillar.

13. An airbag system for a vehicle, comprising:
   an inflatable rear curtain airbag configured to deploy adjacent a rear window positioned between rear pillars in the vehicle, wherein the rear curtain airbag includes an inflatable central region positioned between the rear pillars and first and second inflatable pillar lobes, wherein each of the first and second pillar lobes are positioned adjacent one of the rear pillars;
   a housing for the rear curtain airbag;
   an inflator configured to provide inflation gas for inflating the rear curtain airbag;
   an external deployment strap connected at one end to the rear curtain airbag, wherein the deployment strap is configured to control a position of the rear curtain airbag when deployed; and
   a rear tether rod fixed to one of the rear pillars in the vehicle, wherein a second end of the external deployment strap is connected to the rear tether rod and configured to slide along the rear tether rod during deployment of the rear curtain airbag, wherein the one end of the external deployment strap is fixed to the rear curtain airbag at a zero depth tether forming a bend line dividing the central region of the airbag from the pillar lobe located adjacent to the one of the rear pillars, and wherein the rear tether rod is positioned behind at least one of the first and second inflatable pillar lobes and in front of the rear window.

* * * * *